United States Patent
Goff et al.

Patent Number: 5,505,397
Date of Patent: Apr. 9, 1996

[54] ONE-PIECE VIDEOCASSETTE REEL LOCK SYSTEM

[76] Inventors: Dewain R. Goff; Mary R. Baumler; Howard S. Veith, all of P.O. Box 33427, St. Paul, Minn. 55133-3427

[21] Appl. No.: 279,341

[22] Filed: Jul. 22, 1994

[51] Int. Cl.⁶ .................................. G11B 23/087
[52] U.S. Cl. ...................... 242/338.3; 242/343.2
[58] Field of Search ............... 242/338.3, 343, 242/343.2, 347; 360/132

[56] References Cited

U.S. PATENT DOCUMENTS

| | | |
|---|---|---|
| 4,106,724 | 8/1978 | Higashida . |
| 4,232,840 | 11/1980 | Sugawara . |
| 4,512,534 | 4/1983 | Coy, Jr. et al. . |
| 4,623,105 | 11/1986 | Pertzsch et al. . |
| 4,974,108 | 11/1990 | Bordignon ............... 360/132 |
| 5,092,536 | 3/1992 | Gelardi et al. ............ 242/343 |
| 5,216,564 | 6/1993 | Sin ......................... 360/132 |
| 5,328,126 | 7/1994 | Gelardi et al. ............ 242/343.2 |

FOREIGN PATENT DOCUMENTS

| | | |
|---|---|---|
| 2099400 | 12/1982 | United Kingdom . |
| 3524355 | 1/1987 | Germany . |
| WO 91/18388 | 11/1991 | WIPO . |
| 411622 | 2/1991 | European Pat. Off. . |
| 2246554 | 2/1992 | United Kingdom . |

*Primary Examiner*—John P. Darling
*Attorney, Agent, or Firm*—Gary L. Griswold; Walter N. Kirn; Charles D. Levine

[57] ABSTRACT

An integral one-piece reel lock located in the base lower wall of a videocassette between two reels includes two locking pawl portions, a release lever portion, and connecting arms. The two locking pawl portions are connected to the release lever portion through the connecting arms. The release lever portion has a base and arms. The arms serve as an axis around which the release lever portion can pivot. Each locking pawl portion is mounted on a post on the lower wall of the base adjacent a respective reel, and each locking pawl portion is biased by the connecting arms to engage its respective reel lower flange teeth to lock the reel.

13 Claims, 7 Drawing Sheets

ONE-PIECE VIDEOCASSETTE REEL LOCK SYSTEM

TECHNICAL FIELD

The present invention relates to videocassettes. More particularly, the present invention relates to videocassettes having reel locking devices for preventing unwanted rotation of reels of tape when the videocassettes are not in use.

BACKGROUND OF THE INVENTION

Videocassettes are well known for storing and using magnetic recording tape. A length of magnetic tape is wound onto a supply reel and the free end of the tape is wound onto a takeup reel. Both reels are contained in a housing which can be inserted into a suitable playing or recording apparatus (VCR) such as those of the VHS format.

An important feature of VHS videocassettes is the ability to brake and lock the tape reels against unwanted rotation to prevent unwinding of the tape when the videocassette is not in use. Conventional reel locking devices for VHS videocassettes typically are mounted along a rear wall between the two reels. These devices include locks, which are pivotally mounted levers, or pawls, which engage notches located on the outer periphery of the bottom flanges of the supply and take-up reels. These locking pawls are typically held in engagement with the flanges by one or more springs.

A release device, which is typically an L-shaped release lever, is pivotable around a horizontal axis. The release lever is rotated upon insertion of the videocassette into the VCR by a release pin which enters an aperture in the bottom of the videocassette housing. Rotation of the release lever urges the pawls away from the reel flanges, freeing the reels and allowing them to be driven by the VCR. Typical reel locking devices of this type are disclosed in U.S. Pat. Nos. 4,106,724; 4,232,840; and 4,974,108.

These reel locking devices operate satisfactorily and reliably. The pivoting release levers require a low level of force to operate and having a low level of debris generation due to wear. However, these reel locking devices have several parts. This places a significant economic burden on manufacturers who operate in the price-competitive videocassette market. As a result, several simplifications of the lever-operated pawl and spring devices have been devised.

U.S. Pat. Nos. 4,512,534 and 4,623,105 disclose reel locking devices in which the springs for holding the pawls in engagement with the reels are integrally molded resilient plastic portions of the pawls. A further step in part integration is disclosed in UK Patent Application No. GB 2 099 400, in which both of the pawls and a resilient engagement member connecting them are molded as a single part. This reduces the number of parts to just two—the release lever and the pawl-spring combination.

U.S. Pat. No. 5,216,564 discloses a one piece reel locking device for video cassettes. However, this device requires the spring portion to push against the rear wall of the cassette, and to unlock the reel this device requires that the locking portions extend out of the plane of the reel lower flanges and into the plane of the tape path.

SUMMARY OF THE INVENTION

An integral one-piece reel lock located in the base lower wall of a videocassette between two reels includes two locking pawl portions, a pivoting release lever portion, and connecting arms. The two locking pawl portions are connected to the release lever portion through the connecting arms.

The release lever portion is generally T-shaped and has a base and arms. The arms serve as an axis around which the release lever portion can pivot. Each locking pawl portion is mounted on a post on the lower wall of the base adjacent a respective reel, and each locking pawl portion is biased by the connecting arms to engage its respective reel lower flange teeth to lock the reel. When the videocassette slides into a VCR the release lever portion rotates around its arms to flex the connecting arms to rotate the locking pawl portions in the plane of the reel lower flanges (while remaining out of the plane of the tape path) and to disengage the locking pawl portions from their respective reels to permit reel rotation.

The release lever portion can include a longitudinal rib formed on the base of the T shape and extending for the entire length of the base along a centerline of the base. The release lever portion can also include a connecting portion extending from the release lever portion to the two connecting arms. The arms of the release lever portion of the reel lock terminate in generally cylindrical ends which are received in notches in the center insert area of the base lower wall. The base of the T shape of the release lever portion is wide, has a rounded end, and is sized to cover the aperture in the base lower wall.

The connecting portion can include a living hinge. Each connecting arm is flexible, has a uniform thickness, and has a nonuniform width to uniformly distribute stress.

Each locking pawl portion can include a hollow cylindrical body member which is a complete, unbroken cylinder and a rigid locking arm extending from each cylindrical body member which can engage a respective reel to lock the reel in position.

DETAILED DESCRIPTION

Figure 1:
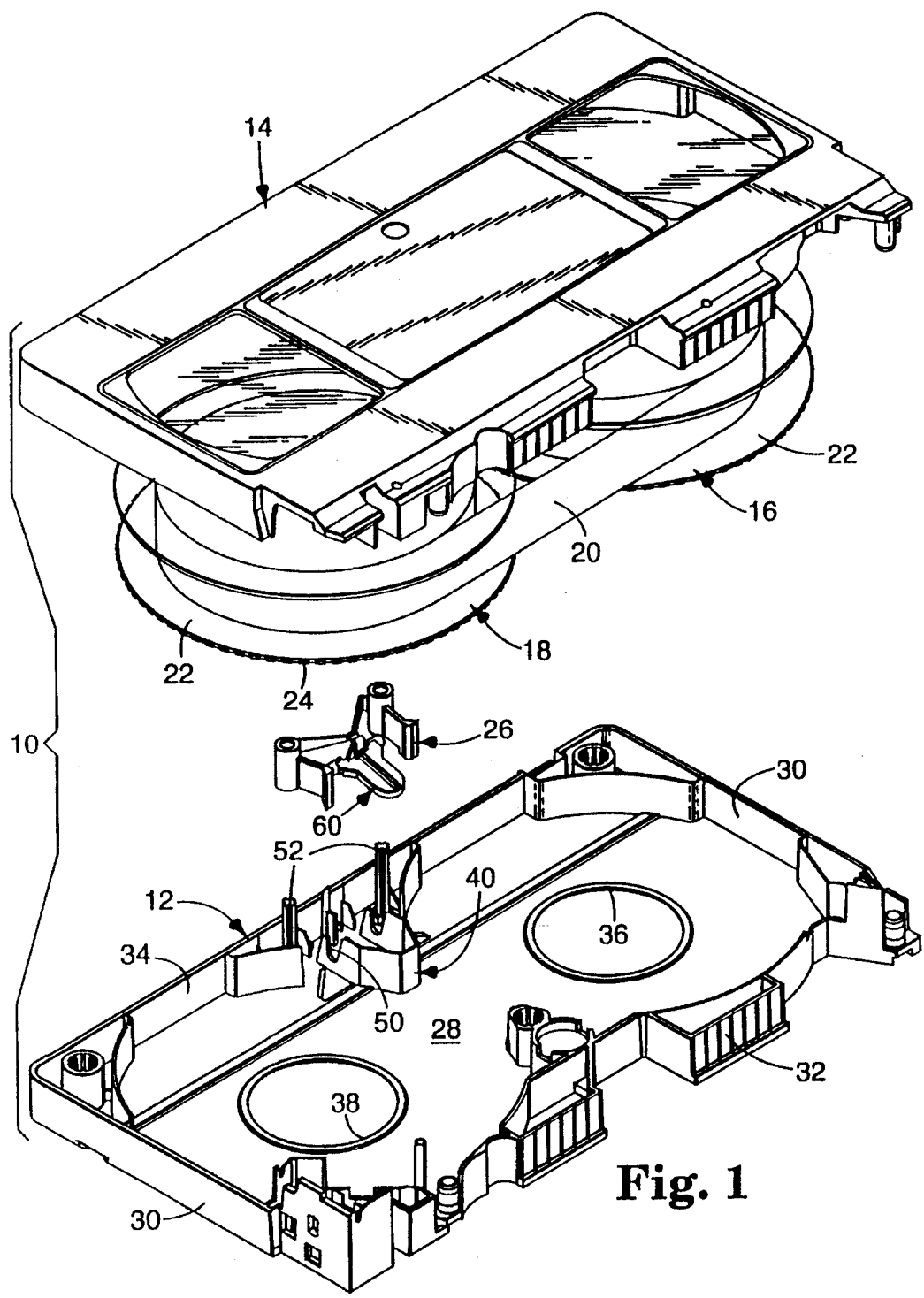
FIG. 1 is an exploded perspective view of a videocassette of this invention.
Figure 2:
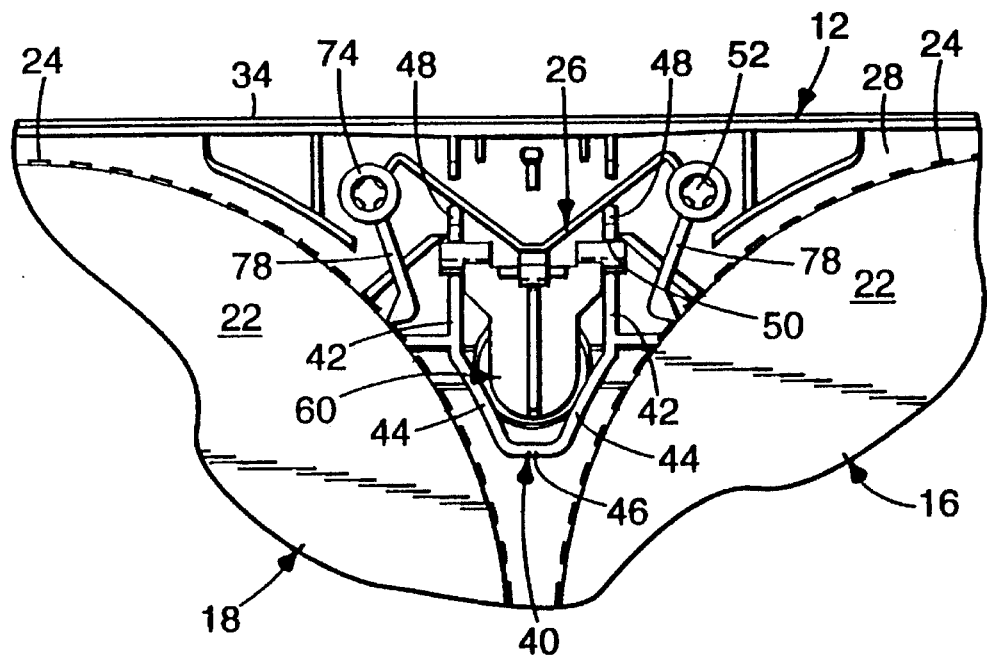
FIG. 2 is a partial top view of the videocassette of FIG. 1 with the reels locked.
Figure 3:
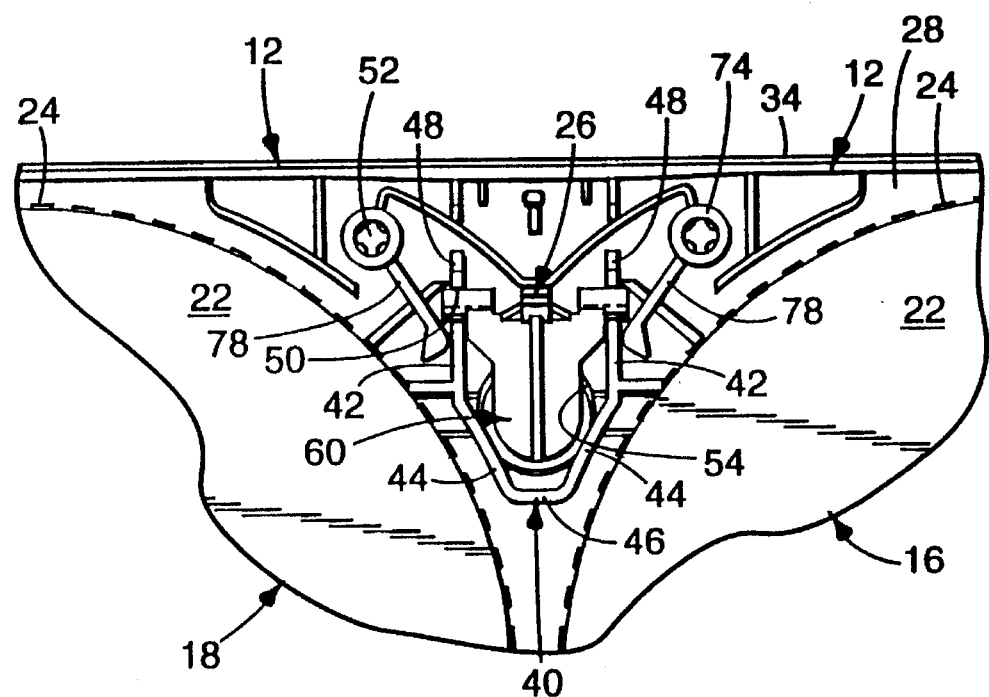
FIG. 3 is a partial top view of the videocassette of FIG. 1 with the reels unlocked.

Referring to FIGS. 1–3, a videocassette 10 typically includes a base 12 and a cover 14, which form the housing, and a door (not shown). Two reels 16, 18 are mounted in the housing. A length of magnetic tape 20 is wound onto a supply reel 16 and the free end of the tape 20 is connected for winding to a takeup reel 18. The lower flanges 22 of the supply and takeup reels 16, 18 have teeth 24 which can be engaged by a reel lock 26.

The base 12 includes a lower wall 28, two opposing side walls 30 perpendicular to the lower wall 28, a front wall 32 perpendicular to the lower and side walls 28, 30, and a rear wall 34 opposing the front wall 32 and perpendicular to the lower and side walls 28, 30. The side walls 30 define the left and right ends of the videocassette 10 while the front and rear walls 32, 34 define the front and rear of the videocassette 10. Supply reel and take-up reel spindle access holes 36, 38 are formed in the lower wall 28 to receive drive spindles for the reels 16, 18. The base 12 is typically produced by injection molding of a thermoplastic material.

A center insert 40 is located on the base lower wall 28 between the spindle access holes 36, 38 and between the reels 16, 18. The center insert 40 holds a reel lock 26 in notches and provides reinforcement to the rear wall 34. The center insert 40 includes two side walls 42, two angled walls 44, and a center wall 46. The side walls 42 each include an end wall 48 which defines notches 50 which hold the release lever portion 60 of the reel lock. Two posts 52 are located in the base lower wall 28, one on the outside of each center insert side wall 42. An aperture 54 in the base lower wall is formed inside of the center insert walls to receive a pin in the VCR which engages the reel lock 26.

Figure 4:
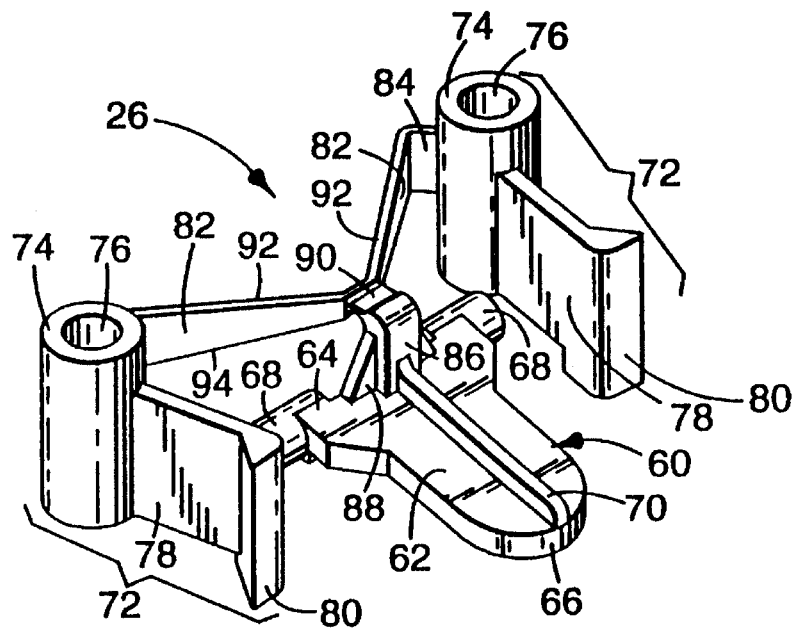
FIG. 4 is a perspective view of the one-piece reel lock of this invention.
Figure 5:
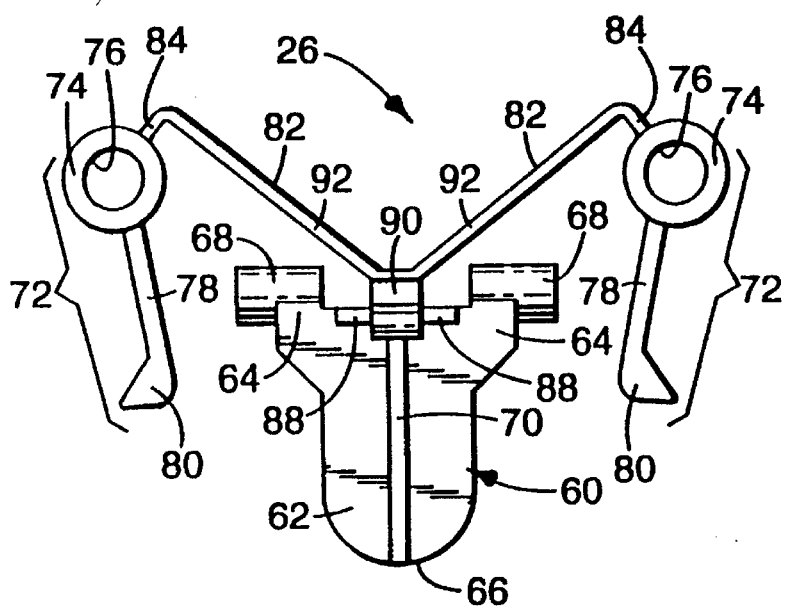
FIG. 5 is a top view of the one-piece reel lock of FIG. 4.

The reel lock 26, best shown in FIGS. 4 and 5, is located in the center insert 40. The reel lock 26 is formed as a symmetrical, integral, one-piece component of a thermoplastic material such as polypropylene. The two locking pawl portions and the release lever portion are combined as a single element to obviate the need for a separate spring. The reel lock 26 can replace existing multiple piece locks without any major base 12 or cover 14 modifications.

The reel lock includes a release lever portion 60 which, as best shown in FIG. 5 is generally T-shaped, having a base 62 and arms 64. The base 62 of the T shape is wide, has a rounded end 66, and is sized to cover the aperture 54 in the base lower wall 28. The arms 64 of the release lever portion 60 terminate in generally cylindrical ends 68 which are received in the notches 50 in the center insert area 40 on the base lower wall 28. The arms 64 serve as an axis around which the release lever portion 60 pivots. A longitudinal rib 70 is formed on the base 62 of the release lever portion 60 and extends for the entire length of and along a centerline of the base 62. The rib 70 strengthens the release lever portion 60. The reel lock 26 is symmetrical around a central axis along the centerline of the base 62.

The reel lock 26 also includes two locking pawl portions 72. Each locking pawl portion 72 is mounted on a respective post 52 in the base 12 of the videocassette 10. One locking pawl portion 72 is mounted adjacent the supply reel 16 and the other locking pawl portion 72 is mounted adjacent the takeup reel 18. Each locking pawl portion 72 disengages from its respective reel 16, 18 to unlock the reel and permit reel rotation when the videocassette 10 slides into a VCR as discussed below.

Each locking pawl portion 72 includes a hollow cylindrical body member 74 which can be a complete, unbroken cylinder. If the cylindrical body member 74 is a complete, unbroken cylinder, a flat parting line can be used in a mold to make the reel lock without any telescoping shutoff. The through hole 76 in the cylindrical body member 74 is perpendicular to the parting line of the mold so no core pull mechanism is required to form the hole.

A rigid locking arm 78 extends radially from each cylindrical body member 74 of the locking pawl portion 72. Each locking arm 78 terminates in a locking end 80 which is triangular and extends from the locking arm. The locking end 80 engages the teeth 24 of the respective tape reel lower flange 22 to lock the reel in position. The locking arms 80 are rigidly connected to the cylindrical body portion 74. The locking ends 80 of the locking pawl portions 72 are at an acute angle, preferably of 83°, to prevent binding with the reel tooth when tape tension is applied to the reel and urges the reel teeth 24 against the locking end 80.

Figure 6:
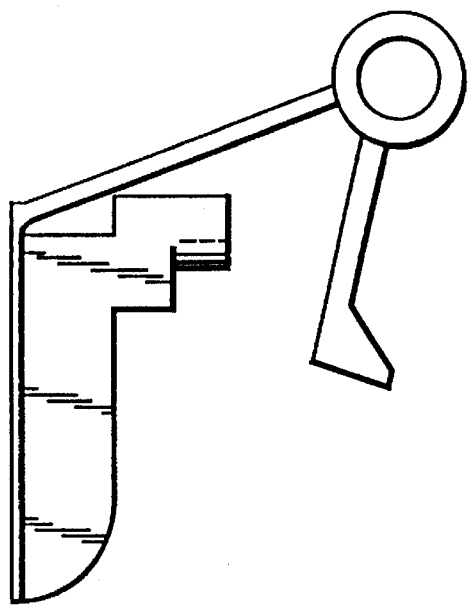
FIG. 6 is a partial top view of an alternative embodiment of the one-piece reel lock.
Figure 7:
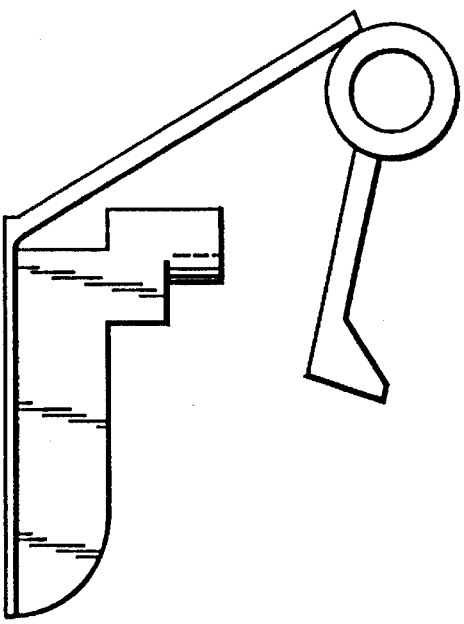
FIG. 7 is a partial top view of an alternative embodiment of the one-piece reel lock.
Figure 8:
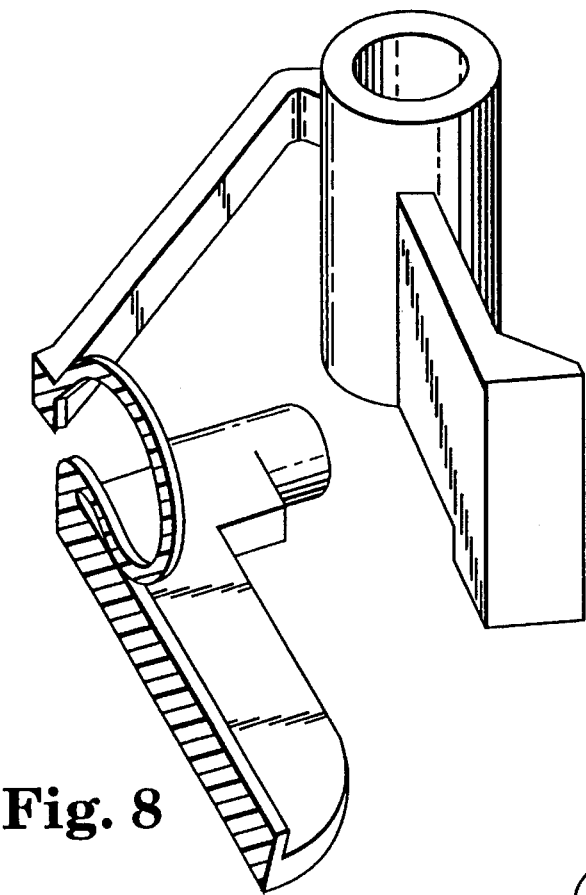
FIGS. 8, 9, 10, and 11 are partial perspective views of alternative embodiments of the connecting portion and living hinge of the one-piece reel lock.
Figure 9:
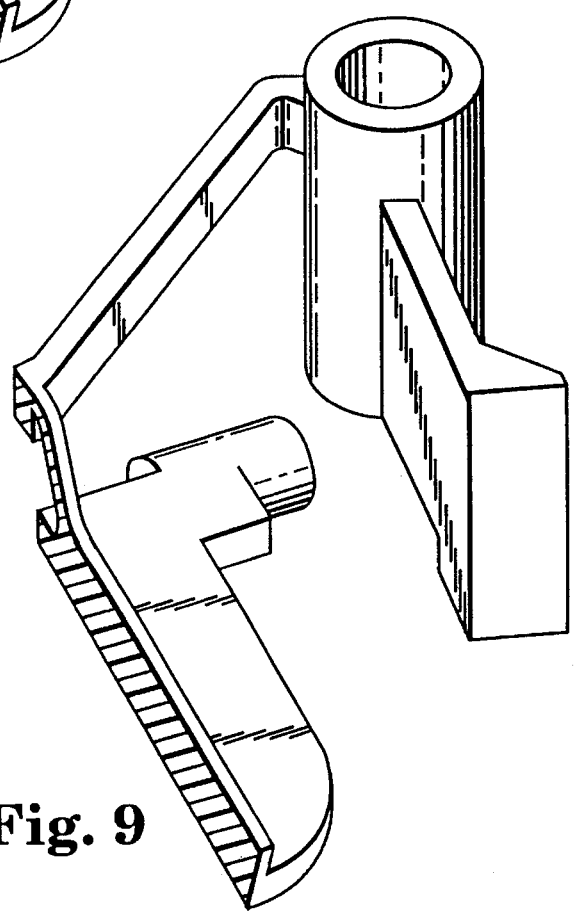
Figure 10:
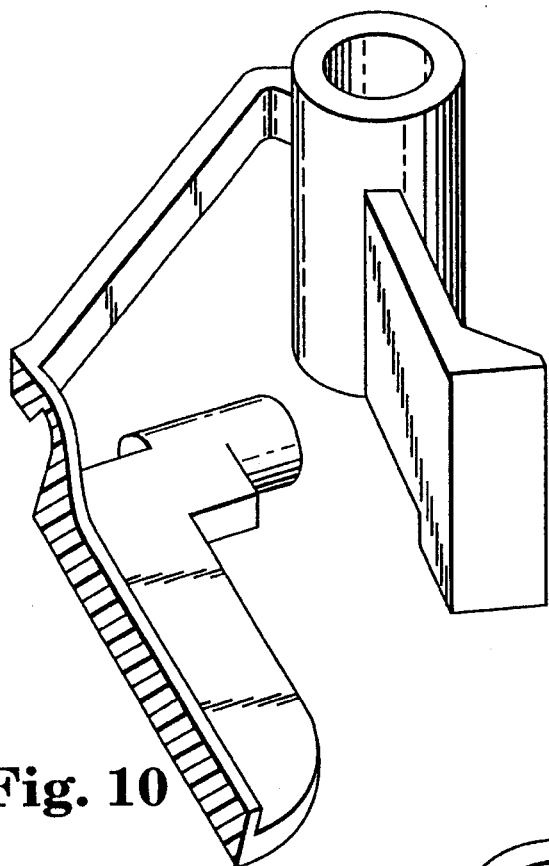
Figure 11:
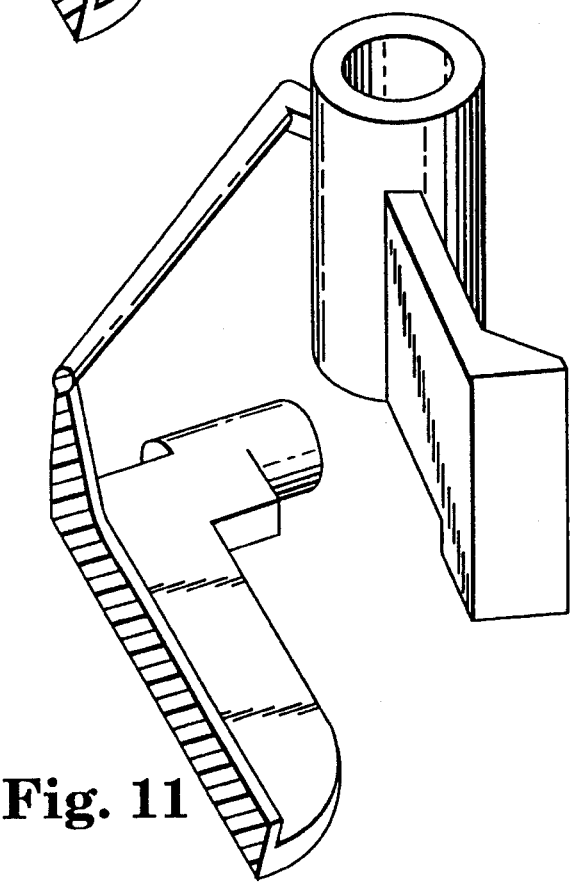

A connecting arm 82 connects each locking pawl portion 72 to the release lever portion 60. As shown, each connecting arm 82 extends from the side of the respective cylindrical body member 74 generally opposite the locking arm 78. Each connecting arm 82 can include a perpendicular portion 84 which extends from the cylindrical body member 74 as best shown in FIG. 5. As shown, the main portion of each connecting arm 82 extends toward the centerline of the release lever portion 60. The connecting arms 82 are flexible. Also, the connecting arms 82 can contact the cylindrical body member 74 along a radius of the cylindrical body member as shown in FIG. 6, or in non-radial orientations, as shown in FIG. 7.

A connecting portion 86 extends generally perpendicularly from the plane of the release lever portion base 62. The connecting portion 86 extends from the centerline at the intersection of the base 62 and the arms 64 of the release lever portion 60. The rib 70 on the base 62 of the release lever portion 60 intersects with the connecting portion 86. Two angular support portions 88 can strengthen the connection between the release lever portion 60 and the connecting portion 86. Projecting horizontally from the top of the connecting portion 86, at the end away from the release lever portion 60, is a reduced wall thickness portion, which can be approximately 0.0254 cm (0.010 in) thick, to serve as a living hinge 90. The living hinge 90 is connected at its other end to the connecting arms 82 and must be sufficiently strong to allow handling during assembly. The connection between the living hinge 90 and the connecting arms must also be thin and can be approximately 0.0305 cm (0.012 in) long to accommodate actuation force specification limits. (The length is established for the spring rate and the thickness is established for the load.)

The living hinge 90 allows the rotation of the connecting portion 86 around the axis of the release lever portion arms 64 to be in a more horizontal plane than would a more rigid transition. The living hinge 90 is equidistant between the cylindrical body members 74 and enables the connecting portion 86 to transfer a defined amount of motion to the connecting arms 82. The connecting portion 86 transmits a specific amount of travel against the connecting arms 82. Alternatively, the connecting portion 86 and the living hinge 90 can assume the configurations shown in FIGS. 8–11.

The connecting arms 82 are flexible and are designed to provide preferably all of the required biasing force. The connecting arms resist deformation and return the spring to the rest position when the release lever portion is released by the VCR. The connecting arms can impart a specific spring force of less than 70 grams when the release lever portion 60 is moved by a maximum of 9.5 mm from the aperture 54, according to the JVC specifications. The upper edge 92 of the connecting arms 82 is parallel to the top of the connecting portion 86 to provide for a natural molding parting line. The lower edge 94 of the connecting arm 82 is not parallel to the upper edge 92. The thickness of the connecting arms 82 is uniform throughout their length. The varying width of the connecting arm 82 is designed to distribute the connecting arms' stress throughout its length and to reduce the stress concentration below the linear stress levels of the material properties. This prevents compressing and permanently deforming the connecting arms, particularly at their contact points with the cylindrical body member 74.

When the videocassette 10 slides into a VCR, a pin in the VCR enters the aperture in the videocassette base lower wall 28 and engages the release lever portion 60 of the reel lock 26. This rotates the release lever portion 60 around its cylindrical arms 64 away from the position in which it covers the base lower wall aperture 54. This, in turn, transfers motion to the connecting portion 86, causing the connecting portion 86 to push against the connecting arms 82 through the living hinge 90. The connecting arms 82 flex and impart a force to rotate the cylindrical body members 74 of the respective locking pawl portions 72. This rotates the locking arms 78 of the locking pawl portions 72 out of engagement with their respective reel lower flanges 22, freeing the reels 16, 18 and allowing them to rotate and be driven by the VCR.

Upon removal of the videocassette 10 from the VCR, the spring tension of the connecting arms 82 rotates the locking pawl portion cylindrical body member 74 to move the locking arms 78 to engage the reel flanges 16, 18, while rotating the release lever portion 60 back to its position covering the aperture 54. Rotation of the locking arms 78 to lock and unlock the reels 16, 18 occurs in the plane of the lower flange 22 of the reels (while remaining out of the plane of the tape path). Thus, the pivoting motion of the release lever portion 60, the deflection of the connecting arms 82, and the rotation of the pawl portions 72 combine to operate the reel lock 26.

The one-piece reel brake 26 can eliminate the need for any supporting structure for a separate spring from the base. This eliminates separate pieces, saves material, and reduces part and assembly costs.

In alternative embodiments, the reel lock can be used with other format cassettes which otherwise use a multiple piece lock system. Also, the intersection of the connecting arms 82 can include a wall extending toward the release lever portion 60 to permit the reel lock 26 to operate even without the living hinge connection. This enables the reel lock to operate as two pieces allowing the reel lock to be formed as a one piece component while separating into two components during assembly or later.

Figure 12:
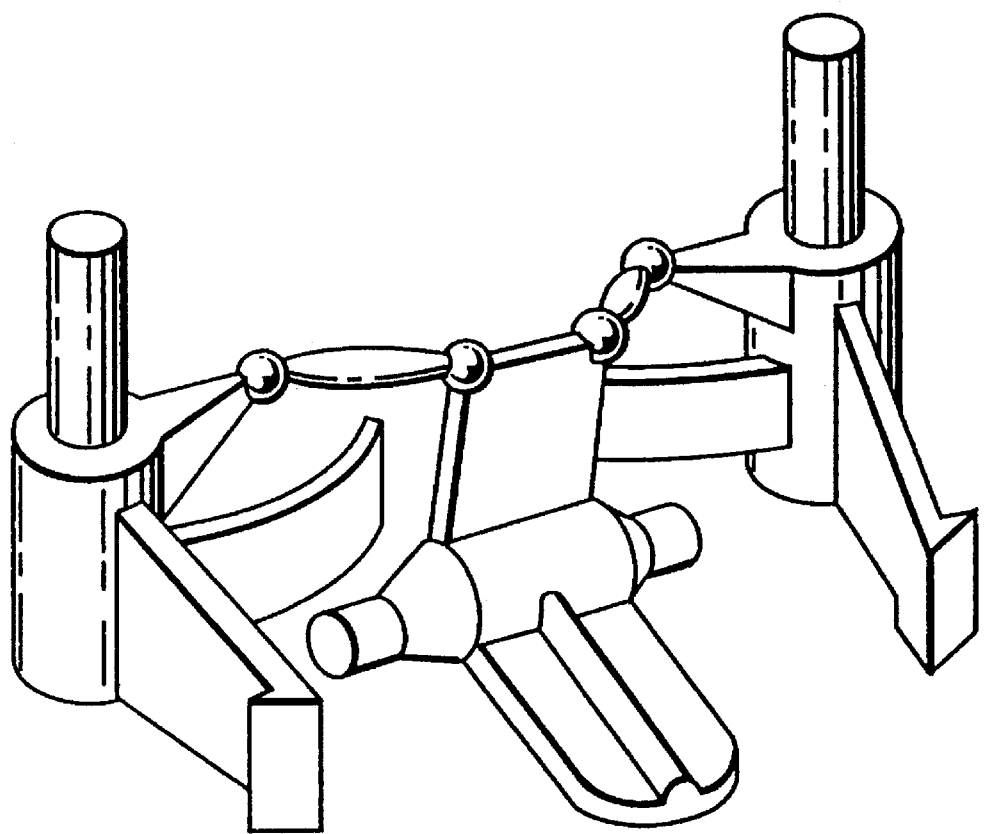
FIG. 12 is a perspective view of an alternative embodiment of the one-piece reel lock.

Also, a supplemental spring can be used in conjunction with the one piece reel lock to enhance the biasing force. This supplemental spring can be used in an embodiment, shown in FIG. 12, in which the connecting arms are hinged and are connected to the connecting member with hinges which can pivot in a complete circular arc. Such a hinge operates as a living ball hinge and also can be used in a plethora of other environments.

We claim:

1. An integral one-piece reel lock for locating in the base lower wall of a videocassette between two reels wherein each reel includes a lower flange with teeth, wherein the base lower wall includes a center insert area, an aperture and two posts, and wherein at least part of the reel lock is located in the center insert area and comprises:

a release lever portion, which is generally T-shaped and has a base and arms, wherein the arms serve as an axis around which the release lever portion can pivot;

two connecting arms; and two locking pawl portions, wherein each connecting arm is connected to a respective locking part portion and is connected to the release lever portion, wherein each locking pawl portion is mounted on a post on the lower wall of the base adjacent a respective reel, and wherein each locking pawl portion is biased by the connecting arms to engage its respective reel lower flange teeth to lock the reel and when the videocassette slides into a VCR the release lever portion rotates around its arms to flex the connecting arms to rotate the locking pawl portions in the plane of the reel lower flanges and to disengage the locking pawl portions from their respective reels to permit reel rotation.

2. The reel lock of claim 1 wherein the base of the T shape of the release lever portion is wide, has a rounded end, and is sized to cover the aperture in the base lower wall.

3. The reel lock of claim 1 wherein the center insert area of the base lower wall includes notches and wherein the arms of the release lever portion of the reel lock terminate in generally cylindrical ends which are received in the notches in the center insert area.

4. The reel lock of claim 1 wherein the release lever portion further comprises a longitudinal rib formed on the base of the T shape and extending for the entire length of the base along a centerline of the base.

5. The reel lock of claim 1 wherein the release lever portion further comprises a connecting portion extending from the release lever portion to the two connecting arms.

6. The reel lock of claim 5 wherein the connecting portion comprises a living hinge.

7. The reel lock of claim 1 wherein each locking pawl portion comprises a hollow cylindrical body member which is a complete, unbroken cylinder.

8. The reel lock of claim 7 wherein each locking pawl portion comprises a locking arm extending from each cylindrical body member which can engage a respective reel to lock the reel in position.

9. The reel lock of claim 1 wherein the two locking pawl portions are connected to the release lever portion through only the respective connecting arms.

10. An integral one-piece reel lock for locating in the base lower wall of a videocassette between two reels wherein each reel includes a lower flange with teeth, wherein the base lower wall includes a center insert area, an aperture and two posts, and wherein at least part of the reel lock is located in the center insert area and comprises:

a release lever portion, which is generally T-shaped and has a base and arms, wherein the arms serve as an axis around which the release lever portion can pivot;

two connecting arms; and two locking pawl portions, wherein each connecting arm connects a respective locking pawl portion to the release lever portion, wherein each locking pawl portion is mounted on a post on the lower wall of the base adjacent a respective reel, wherein each locking pawl portion is biased by the connecting arms to engage its respective reel lower flange teeth to lock the reel and when the videocassette slides into a VCR the release lever portion rotates around its arms to flex the connecting arms to rotate the locking pawl portions in the plane of the reel lower flanges and to disengage the locking pawl portions from their respective reels to permit reel rotation, and wherein each locking pawl portion comprises a hollow cylindrical body member and wherein each connecting arm comprises a perpendicular portion which extends from the cylindrical body member and a main portion which extends toward the release lever portion.

11. The reel lock of claim 10 wherein the perpendicular portion of at least one connecting arm is collinear with the main portion of the same connecting arm.

12. The reel lock of claim 10 wherein the perpendicular portion of at least one connecting arm forms an angle with the main portion of the same connecting arm.

13. An integral one-piece reel lock for locating in the base lower wall of a videocassette between two reels wherein each reel includes a lower flange with teeth, wherein the base lower wall includes a center insert area, an aperture and two posts, and wherein at least part of the reel lock is located in the center insert area and comprises:

- a release lever portion, which is generally T-shaped and has a base and arms wherein the arms serve as an axis around which the release lever portion can pivot;
- two connecting arms wherein each connecting arm is flexible, has a uniform thickness, and has a nonuniform width to uniformly distribute stress; and
- two locking pawl portions, wherein each connecting arm connects a respective locking pawl portion to the release lever portion, wherein each locking bawl portion is mounted on a post on the lower wall of the base adjacent a respective reel, and wherein each locking pawl portion is biased by the connecting arms to engage its respective reel lower flange teeth to lock the reel and when the videocassette slides into a VCR the release lever portion rotates around its arms to flex the connecting arms to rotate the locking pawl portions in the plane of the reel lower flanges and to disengage the locking pawl portions from their respective reels to permit reel rotation.

* * * * *